(12) United States Patent
Florac et al.

(10) Patent No.: US 11,849,519 B2
(45) Date of Patent: *Dec. 19, 2023

(54) SYSTEMS, METHODS, AND DEVICES FOR INFLUENCING SPECTRAL CONTENT OF A LIGHT OUTPUT

(71) Applicant: Electronic Theatre Controls, Inc., Middleton, WI (US)

(72) Inventors: William R. Florac, Verona, WI (US); Evan Gnam, Madison, WI (US); Wendy Luedtke, Brooklyn, NY (US); James Uphoff, Madison, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/583,765

(22) Filed: Jan. 25, 2022

(65) Prior Publication Data

US 2022/0151044 A1    May 12, 2022

Related U.S. Application Data

(63) Continuation of application No. 17/173,286, filed on Feb. 11, 2021, now Pat. No. 11,240,898.

(60) Provisional application No. 62/975,459, filed on Feb. 12, 2020.

(51) Int. Cl.
| | |
|---|---|
| *H05B 47/11* | (2020.01) |
| *H05B 45/20* | (2020.01) |
| *H05B 47/125* | (2020.01) |
| *H05B 45/22* | (2020.01) |
| *H05B 47/14* | (2020.01) |

(52) U.S. Cl.
CPC ............ *H05B 47/11* (2020.01); *H05B 45/20* (2020.01); *H05B 45/22* (2020.01); *H05B 47/125* (2020.01); *H05B 47/14* (2020.01)

(58) Field of Classification Search
CPC ...... H05B 47/11; H05B 47/14; H05B 47/125; H05B 45/20; H05B 45/22; H05B 39/04; Y02B 20/40
See application file for complete search history.

(56) References Cited

U.S. PATENT DOCUMENTS

| | | |
|---|---|---|
| 6,683,423 B2 | 1/2004 | Cunningham |
| 8,403,523 B2 | 3/2013 | Gerlach et al. |
| 8,723,450 B2 | 5/2014 | Hatley et al. |
| 9,144,140 B1 | 9/2015 | Bewick et al. |

(Continued)

OTHER PUBLICATIONS

Search Report issued by the United Kingdom Intellectual Property Office for Application No. 2101900.5 dated Aug. 11, 2021 (3 pages).

*Primary Examiner* — Haissa Philogene
(74) *Attorney, Agent, or Firm* — Michael Best & Friedrich LLP

(57) ABSTRACT

A method for control of a light fixture, the method including energizing the light fixture to produce a first light output with a first chromaticity and a first spectral power distribution, receiving a user input representative of a desired adjustment of a lighting effect, generating a target spectrum based on the user input, and energizing the light fixture to produce a second light output with the first chromaticity and a second spectral power distribution. The second power distribution approximates the target spectrum.

20 Claims, 10 Drawing Sheets

(56) References Cited

U.S. PATENT DOCUMENTS

| | | |
|---|---|---|
| 9,198,252 B2 | 11/2015 | Laski et al. |
| 9,451,668 B2 | 9/2016 | Bewick et al. |
| 9,820,360 B2 | 11/2017 | Paolini et al. |
| 9,851,072 B2 | 12/2017 | Wagemans et al. |
| 9,900,957 B2 | 2/2018 | van de Ven et al. |
| 9,955,551 B2 | 4/2018 | Spero |
| 10,056,018 B1* | 8/2018 | Laski ................ F21S 10/066 |
| 10,426,018 B2* | 9/2019 | Paolini ................ H05B 47/19 |
| 10,433,392 B2* | 10/2019 | Simonian .............. H05B 45/22 |
| 11,240,898 B2* | 2/2022 | Florac ................ H05B 45/22 |
| 2006/0104058 A1* | 5/2006 | Chemel ................ H05B 45/00 |
| | | 362/231 |
| 2012/0206050 A1* | 8/2012 | Spero ................ B60Q 1/1423 |
| | | 315/152 |
| 2015/0084542 A1 | 3/2015 | Chen |
| 2016/0273717 A1* | 9/2016 | Krames ............ G02F 1/133603 |
| 2018/0070421 A1* | 3/2018 | Soler .................. H05B 45/24 |
| 2018/0106675 A1* | 4/2018 | Yao ..................... G01J 1/4228 |
| 2022/0110195 A1* | 4/2022 | Casey ................ H05B 47/155 |

* cited by examiner

SYSTEMS, METHODS, AND DEVICES FOR INFLUENCING SPECTRAL CONTENT OF A LIGHT OUTPUT

CROSS-REFERENCE TO RELATED APPLICATIONS

This application is a continuation of U.S. patent application Ser. No. 17/173,286, filed Feb. 11, 2021, which claims the benefit of U.S. Provisional Patent Application No. 62/975,459, filed Feb. 12, 2020, the entire content of each of which is hereby incorporated by reference.

FIELD

Embodiments described herein relate to influencing the spectral content of a light output.

BACKGROUND

Lighting systems used in architecture, theaters, concert stages, and other applications may be configured to control the light produced by a light source, such as a light fixture, luminaire, array of light emitting diodes, or other lighting device.

SUMMARY

The lighting system may be controlled in various ways to produce a desired chromaticity (i.e., color) for the output light. Holding the chromaticity of the light output while adjusting the spectral content of the light output is called metameric control. For example, U.S. Pat. No. 8,723,450, incorporated herein by reference, discloses controlling the spectral content of the output of a light fixture by modifying the output intensity value of one or more of the light sources that make up the light fixture. For example, the user may adjust upwards the power output of a red light emitting diode ("LED") within the light fixture. After modifying the output intensity values of individual emitters, a color control and matching technique is used to identify a new set of output intensity values for the remaining emitters that maintains the desired color output. The method of adjusting spectral content of a light output disclosed in U.S. Pat. No. 8,723,450 is specific to a given light fixture because the control adjusts the output of the specific light sources (e.g., individual LED) contained within the light fixture. However, different light fixtures have different light sources, so the method disclosed in U.S. Pat. No. 8,723,450 is not readily applicable or generic across different light fixtures. Finally, although the user is able to adjust the spectral content of the light output in the method disclosed in U.S. Pat. No. 8,723,450, the user is not provided control over or insight into how, for example, an object will appear when illuminated by the light output with the modified spectral content. In other words, the user is able to adjust the spectral content of the light output in U.S. Pat. No. 8,723,450 but does not have control over the lighting effect or effects (i.e., as perceived by a human observer or camera observer) created by the changing spectral content.

Embodiments described herein address this and other technical problems by analyzing aspects of perceived light to adjust the perceived appearance of the light output according to user specifications. The aspects of the perceived light controlled by embodiments described herein may include, for example, how the user perceives an object within the light output. In this way, the user alters the look and/or feel of the object according to how the user wants the object to appear. As a result, the user can alter how the object appears without altering the chromaticity of the light output. For example, the user may desire the object (e.g., human skin) to appear sickly under a metameric (constant-chromaticity) illuminant, or to appear brighter under a constant-power illuminant, or both.

Methods described herein provide for control of a light fixture, the method including energizing the light fixture to produce a first light output with a first chromaticity and a first spectral power distribution, receiving a user input representative of a desired adjustment of a lighting effect, generating a target spectrum based on the user input, and energizing the light fixture to produce a second light output with the first chromaticity and a second spectral power distribution. The second power distribution approximates the target spectrum.

Lighting control systems described herein include one or more light fixtures, one or more driver circuits, a user interface, and a controller. The one or more driver circuits are configured to provide drive signals to the one or more light fixtures. The user interface is configured to receive an input related to a light output of the one or more light fixtures. The input is representative of an adjustment of a lighting effect. The controller is connected to the one or more driving circuits and the user interface. The controller includes a processor and a memory. The controller is configured to energize the one or more light fixtures to produce a first light output with a first chromaticity and a first spectral power distribution, receive the input representative of the adjustment of the lighting effect, generate a target spectrum based on the input, and energize the one or more light fixtures to produce a second light output with the first chromaticity and a second spectral power distribution, the second power distribution approximates the target spectrum.

Controllers for controlling a light output of a light fixture described herein include a non-transitory computer readable medium and a processor. The controller includes computer executable instructions stored in the computer readable medium for controlling operation of the controller to energize the light fixture to produce a first light output with a first chromaticity and a first spectral power distribution, receive an input representative of an adjustment of a lighting effect, generate a target spectrum based on the user input, and energize the light fixture to produce a second light output with the first chromaticity and a second spectral power distribution, the second power distribution approximates the target spectrum.

It should be understood that the terms spectral match, spectrally matching, and the like (including similar terms with fixed or constant) refer to the application of an optimization procedure for spectrally matching the output composite light spectrum of the composite light source to a given target spectrum. It should be understood that the spectral match provided by the composite light source will not necessarily be identical to the target spectrum. But, it will be optimally close or as close as possible according to given system constraints. Similarly, the terms chromaticity match, chromaticity matching, constant chromaticity, fixed chromaticity, and the like refer to the application of an optimization procedure for matching CIE chromaticity coordinates of the output composite light source spectrum to CIE chromaticity coordinates of a given target spectrum. It should be understood that the chromaticity match provided by the composite light source will not necessarily be identical to the target spectrum. But, it will be optimally close or as close as possible according to given system constraints.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Figure 1:
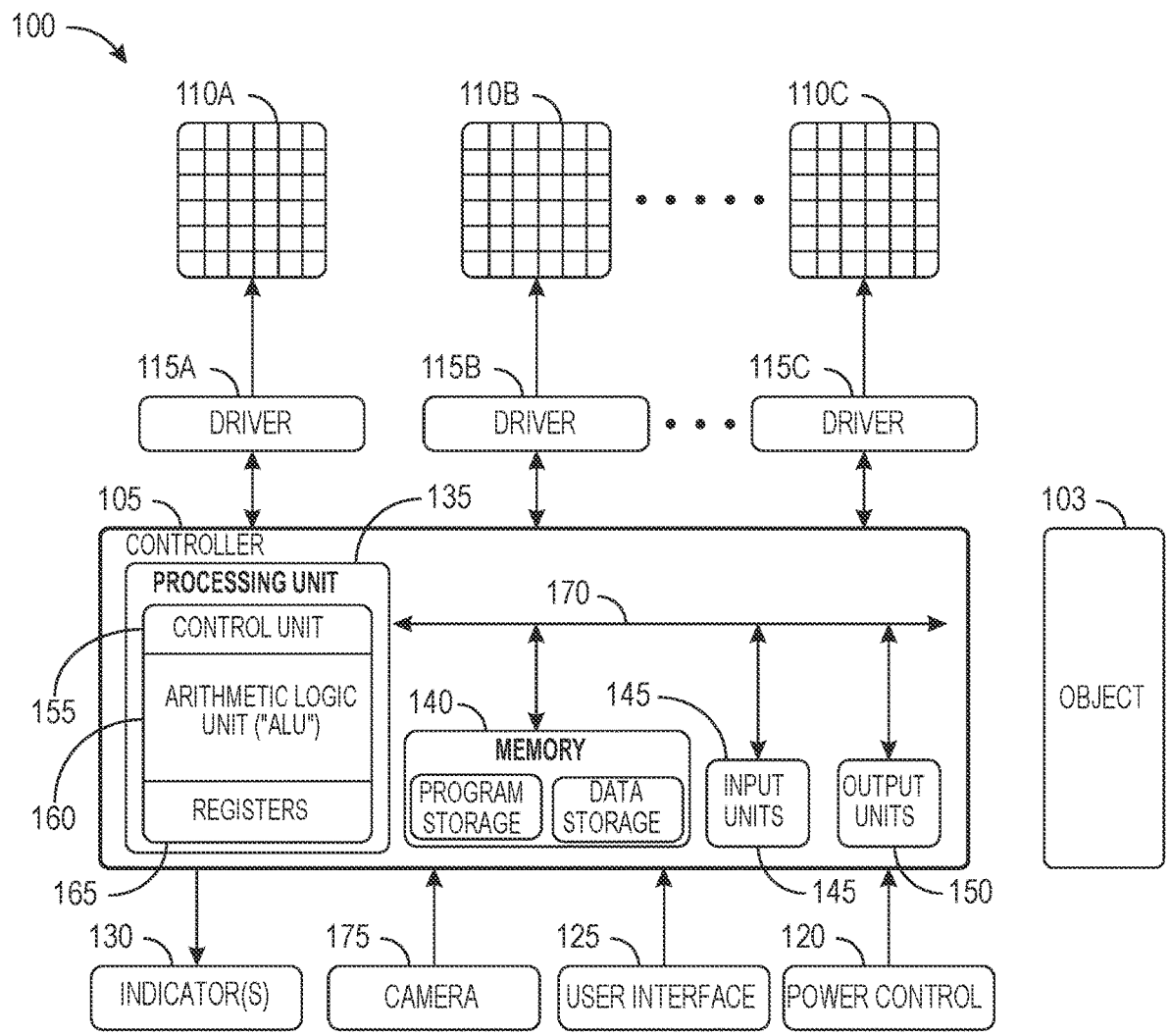
FIG. 1 is a block diagram of a lighting control system.
Figure 2:
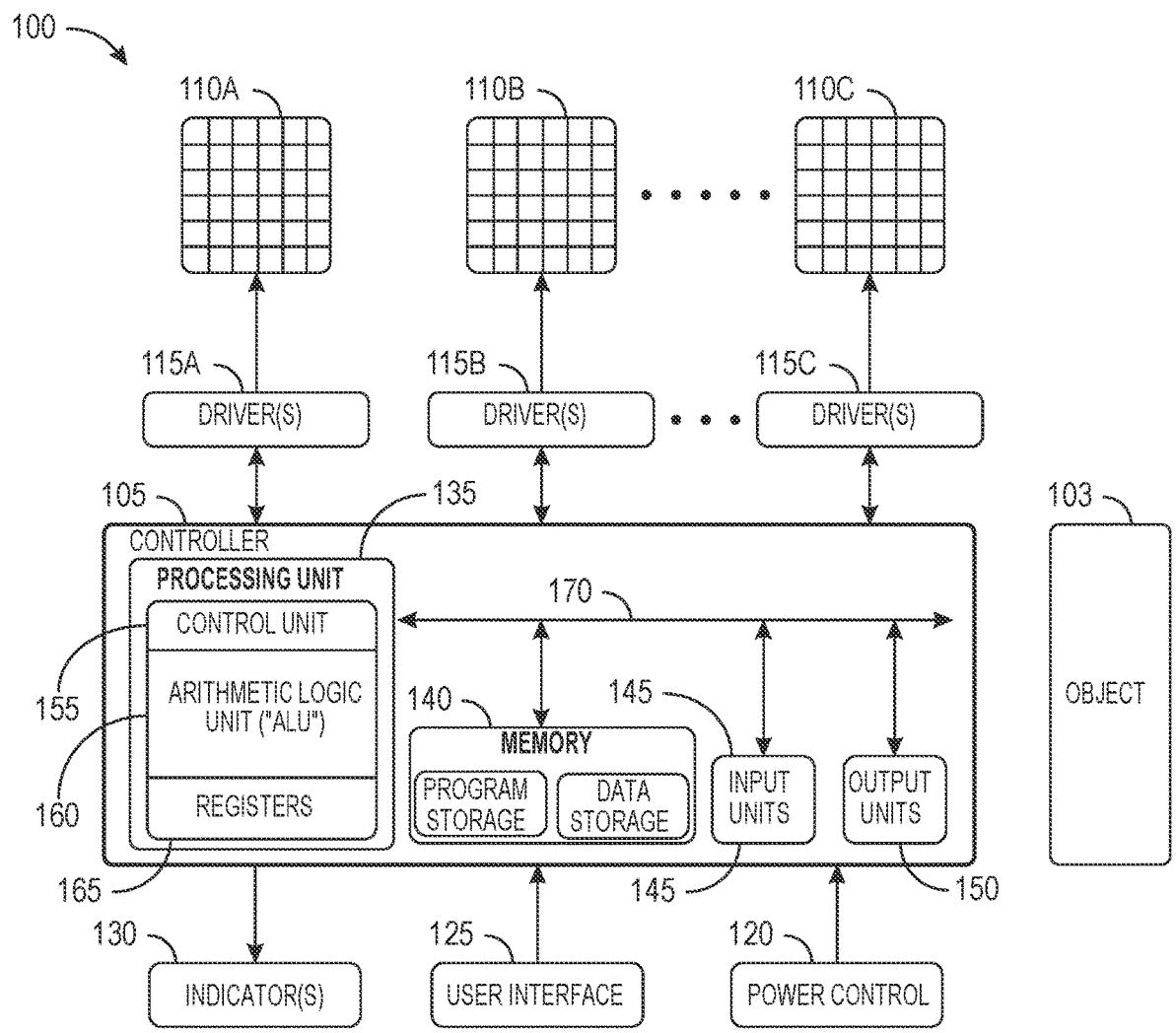
FIG. 2 is a block diagram of a lighting control system according to another embodiment.

FIGS. 1 and 2 illustrate a control system 100 that can be used in, for example, a theatre, a hall, an auditorium, a hotel, a cruise ship, or the like. In some embodiments, the control system 100 is disposed within a light fixture. In other embodiments, only a portion of the control system 100 is disposed in the light fixture. The control system 100 is configured to generate a light output and project that light output onto an object 103 according to specifications of a user for how the object 103 is to appear in the light output. The object 103 may be a human (e.g., skin), an inanimate object (e.g., fruit or fabric), a wall, or the like. Additionally, the light output may be projected onto a plurality of objects 103 (e.g., a class of objects). For descriptive purposes, light is generally described as being projected onto the object 103. However, in any instance where the object 103 is referenced, light can additionally be projected onto a plurality of objects 103 of the same or different classes of objects. The user specifications may alter the look and/or feel of the object 103 according to how the user wants the object to appear, which allows the user to alter how the object appears without altering the chromaticity of the light output.

The control system 100 includes a controller 105, a plurality of light modules or light arrays 110A-110C (e.g., light fixtures, color channels, etc.), a plurality of driver circuits 115A-115C, a power control circuit 120, an input mechanism 125, and one or more indicators 130. The controller 105 includes a plurality of electrical and electronic components that provide power, operational control, and protection to the components and modules within the controller 105 and/or the system 100. For example, the controller 105 includes, among other things, a processing unit 135 (e.g., a microprocessor, a microcontroller, an electronic controller, an electronic processor, or another suitable programmable device), a memory 140, input units 145, and output units 150. The processing unit 135 includes, among other things, a control unit 155, an arithmetic logic unit ("ALU") 160, and a plurality of registers 165 (shown as a group of registers in FIG. 1), and is implemented using a known computer architecture (e.g., a modified Harvard architecture, a von Neumann architecture, etc.). The processing unit 135, the memory 140, the input units 145, and the output units 150, as well as the various modules connected to the controller 105 are connected by one or more control and/or data buses (e.g., common bus 170). The use of one or more control and/or data buses for the interconnection between and communication among the various modules and components would be known to a person skilled in the art in view of the embodiments described herein. The control and/or data buses are shown generally for illustrative purposes.

In some embodiments, the control system 100 also includes a camera 175 configured to detect the light from the modules 110A-110C reflected off of the object 103 (as shown in FIG. 1). In some embodiments, the camera 175 is a spectrometer, or another device specifically designed to detect a light spectrum. In other embodiments, the control system 100 does not include the camera 175 (as shown in FIG. 2). In these embodiments, the control system 100 operates in an open loop manner (i.e., without a closed-loop camera feedback system).

The memory 140 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 135 is connected to the memory 140 and executes software instructions that are capable of being stored in a RAM of the memory 140 (e.g., during execution), a ROM of the memory 140 (e.g., on a generally permanent basis), or another non-transitory computer readable medium such as another memory or a disc. Software included in the implementation of the control system 100 can be stored in the memory 140 of the controller 105. The software includes, for example, firmware, one or more applications, program data, filters, rules, one or more program modules, and other executable instructions. The controller 105 is configured to retrieve from the memory 140 and execute, among other things, instructions related to the control processes and methods described herein. In other embodiments, the controller 105 includes additional, fewer, or different components.

The user interface 125 is included to control the control system 100. The user interface 125 is operably coupled to the controller 105 to control, for example, the output of the light modules 110A-110C, and generate and provide control signals for the driver circuits 115A-115C. The user interface 125 can include any combination of digital and analog input devices to achieve a desired level of control for the control system 100. For example, the user interface 125 can include a computer having a display and input devices, a touchscreen display, a plurality of knobs, dials, switches, buttons, faders, or the like. In some embodiments, the user interface 125 is separated from the control system 100 (e.g., as a portable device communicatively connected to the controller 105).

The driver circuits 115A-115C include a first driver circuit 115A, a second driver circuit 115B, and a third driver circuit 115C that are operable to provide control signals to the light modules 110A-110C. For example, the first driver circuit 115A is connected to a first light module 110A for providing one or more drive signals to an array of (i.e., one or more) light sources of the first light module 110A. The second driver circuit 115B is connected to a second light module 110B for providing one or more drive signals to an array of (i.e., one or more) light sources on the second light module 110B. The third driver circuit 115C is connected to a third light module 110C for providing one or more drive signals to an array of (i.e., one or more) light sources on the third light module 110C. In some embodiments, each of the light modules 110A-110C corresponds to a color channel of a light. In other embodiments, each of the light modules 110A-110C corresponds to a separate light fixture.

The power control circuit 120 supplies a nominal AC or DC voltage to the control system 100. In some embodiments, the power control circuit 120 is powered by one or more batteries or battery packs. In other embodiments, the power control circuit 120 is powered by mains power having nominal line voltages between, for example, 100V and 240V AC and frequencies of approximately 50-60 Hz. The power control circuit 120 is also configured to supply lower voltages to operate circuits and components within the control system 100.

As illustrated in FIGS. 1 and 2, the controller 105 is connected to light modules 110A-110C. In some embodiments, each light module 110A-110C is a chip-on-board ("COB") light source. A three light module embodiment is illustrated for exemplary purposes only. In other embodiments, four or more light modules are used to further enhance the system 100's ability to produce visible light. Conversely, in other implementations, fewer than three light modules are used (i.e., one or two light modules). In some embodiments, the light modules 110A-110C are light emitting diode ("LED") light modules. In some embodiments, the light modules 110A-110C produce white light. In other embodiments, the light modules 110A-110C produce colored light (i.e., non-white light).

Figure 3:
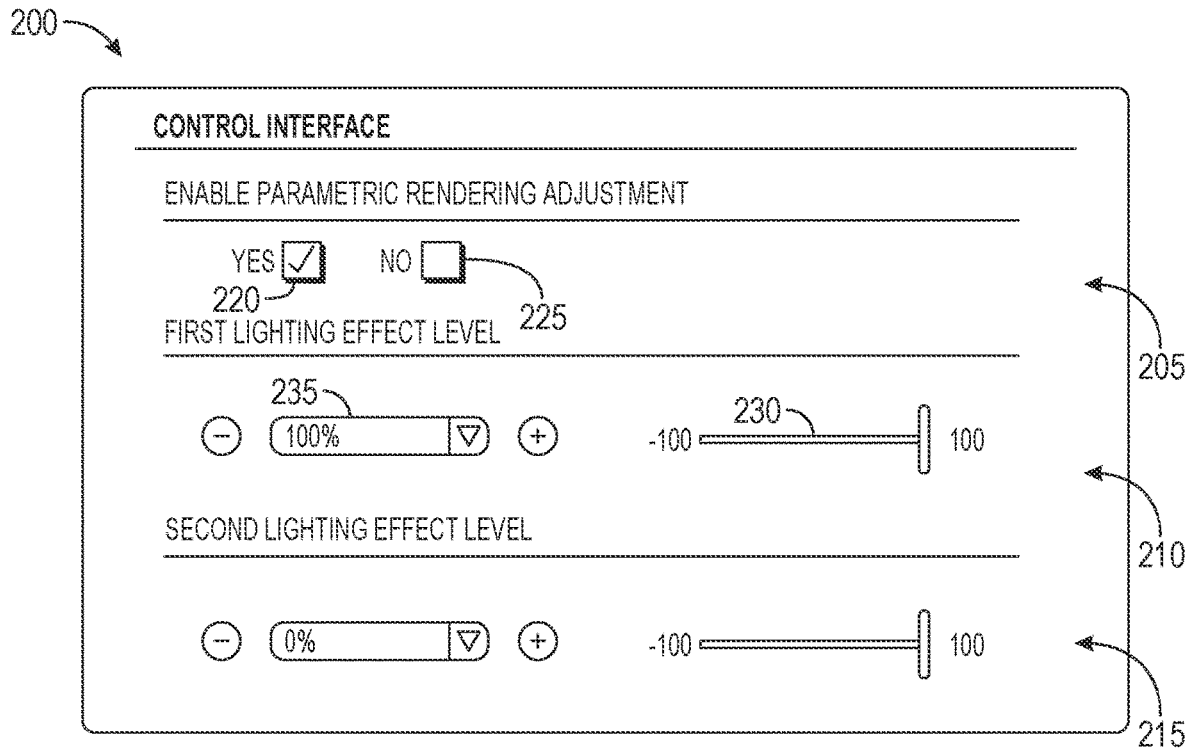
FIG. 3 illustrates a control interface for a lighting system.

The control system 100 further includes a control interface 200 (see FIG. 3) for controlling a visual appearance of the light output light from the light modules 110A-110C that is, for example, reflected from the object 103. In some embodiments, the control interface 200 is included in the user interface 125. The control interface 200 is, for example, a graphical user interface ("GUI") that is displayed on a monitor or similar display. In some embodiments, the control interface 200 is a physical interface and includes one or more buttons, knobs, dials, faders, or the like.

The illustrated control interface 200 includes an optional enable parametric rendering adjustment section 205, a first lighting effect level section 210, and a second lighting effect level section 215. The enable parametric rendering adjustment section 205 includes a YES checkbox 220 and a NO checkbox 225. The checkboxes 220 and 225 are used to select or deselect parametric rendering adjustment (i.e., control based on visual appearance of the lighting effect).

The parametric rendering adjustment can use the first lighting effect level section 210 and/or the second lighting effect level section 215 to implement lighting effects that modify the appearance of light, for example, reflected off the object 103. The first and second lighting effect level of the sections 210, 215 may include control of quality, luminance, hue, power, color temperature, or the like. The first and second lighting effects are generic to any light fixture and allows the user to control effects to the best of the system's ability, regardless of what light fixture is used.

In some embodiments, the parametric rendering adjustment includes more than two lighting effect level sections. In the illustrated embodiment, each of the lighting effect level sections includes a maximum value and a minimum value. For the purposes of this embodiment, the maximum value is a value of positive 100 (e.g., oversaturation). The minimum value is a value of negative 100 (e.g., undersaturation). For example, the maximum undersaturation value is the inverse of the maximum oversaturation value. The first and second lighting effect level sections 210, 215 each include a slider 230 and a drop-down menu 235. The slider 230 ranges from negative 100 to positive 100 (e.g., from undersaturation to oversaturation). The drop-down menu 235 ranges from −100% to 100%. In other embodiments, the first and second lighting effect level sections 210 include different selection mechanisms. In conventional lighting control systems, the first and second lighting effects are not directly controllable along a continuum (i.e., negative 100 to positive 100). In this way, the control interface 200 permits the user to precisely control aspects of the output light that would not otherwise be directly adjustable and controllable by conventional controls, all while maintaining the same output chromaticity. Non-limiting examples of lighting effects to be controlled by the interface 200 are described in further detail herein.

With reference to FIGS. 4-8C, in one embodiment, the lighting effect controlled by the interface 200 is the hue shift of an objected illuminated by the light output of the light arrays 110A-110C. With this control, the illuminated object 103 may appear to an observer (i.e., a human or camera) to be different colors and can be adjusted by a user while holding the output light chromaticity constant.

Figure 4:
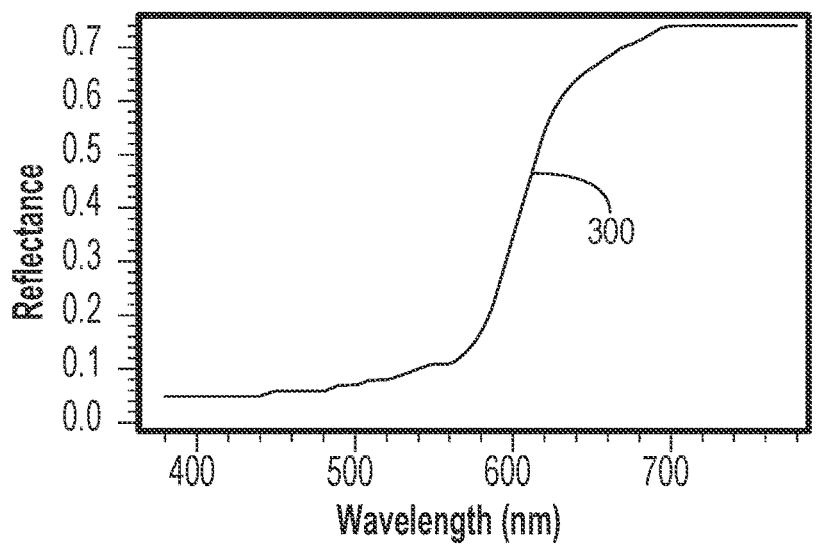
FIG. 4 is a graph of the spectral reflectance function for an object.
Figure 5:
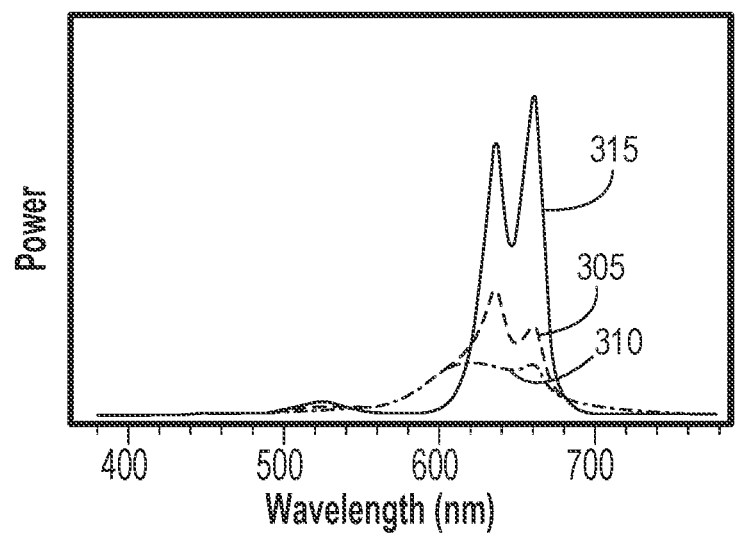
FIG. 5 is a graph illustrating the spectral power distribution of light reflected off the object of FIG. 4 under a default condition, a positive hue shift condition, and a negative hue shift condition.

With reference to FIG. 4, a spectral reflectance function 300 of a first example object (e.g., a grapefruit) is illustrated. The spectral reflectance function 300 illustrates how incoming light will be reflected off the object—with longer wavelengths (e.g., greater than 600 nm) reflected more than shorter wavelengths. With the control interface 200, the hue of the first example object may be controlled between a default condition, a positive hue shift condition (e.g., +100 adjustment of the first lighting effect level section 210), and a negative hue shift condition (e.g., −100 adjustment of the first lighting effect level section 210). In other words, the control interface 200 is utilized by a user to control the color appearance of the first example object without changing the chromaticity of the output light. For each of these conditions, the resulting spectral power distribution of light reflected off the first example object (i.e., the grapefruit's rendered spectra) is illustrated in FIG. 5. Specifically, the rendered spectrum 305 is for the default condition, the rendered spectrum 310 is for the positive hue shift condition, and the rendered spectrum 315 for the negative hue shift condition.

Figure 6:
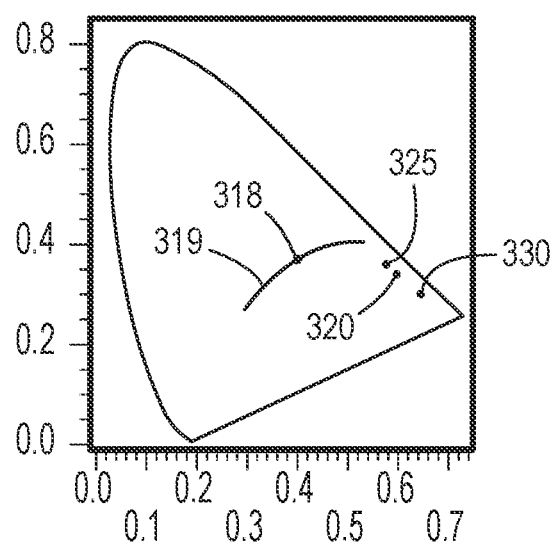
FIG. 6 is a CIE 1931 chromaticity diagram illustrating the chromaticity of the object of FIG. 4 under the default condition, the positive hue shift condition, and the negative hue shift condition of FIG. 5.

With reference to FIG. 6, each of these rendered spectrums 305, 310, 315 correspond to an object chromaticity 320, 325, 330 as illustrated in a CIE 1931 chromaticity diagram. More specifically, the first example object appears to an observer at a default chromaticity 320 with an output light chromaticity 318. In the illustrated embodiment, the output light chromaticity 318 is on the Planckian locus 319 and is held constant. The first example object appears to an observer at a positive hue shift chromaticity 325 in the positive hue shift condition and at a negative hue shift chromaticity 330 in the negative hue shift condition. As such, the control interface 200 permits a user to adjust the chromaticity of the light reflected off of the first example object while maintaining the output light chromaticity constant.

Figure 7A:
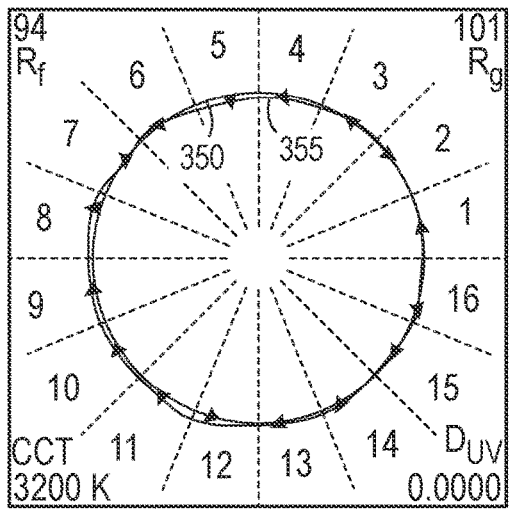
FIG. 7A is a TM-30 color vector graphic for the default condition of FIG. 5.
Figure 7B:
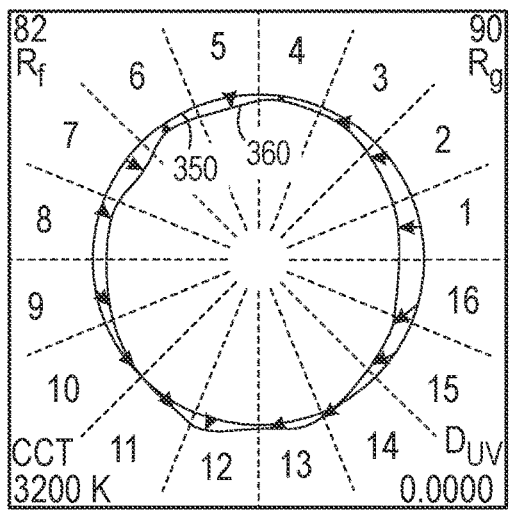
FIG. 7B is a TM-30 color vector graphic for the positive hue shift condition of FIG. 5.
Figure 7C:
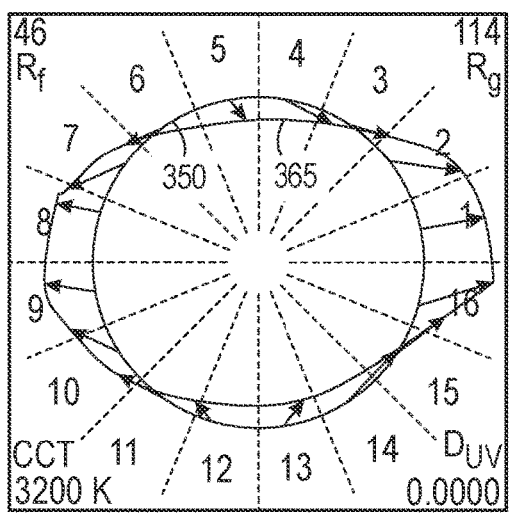
FIG. 7C is a TM-30 color vector graphic for the negative hue shift condition of FIG. 5.

With reference to FIGS. 7A-7C, color vector graphics are illustrated according to the TM-30 standard. In general, a color vector graphic shows how the color evaluation samples, representative of a wide range of objects, are likely to undergo either a saturation (chroma) shift, a hue shift, or both. The color vector graphic is divided into 16 equal sections with for, example, section 1 representative of red and section 9 representative of cyan. The reference illuminant is normalized to a reference circle 350 and the gamut of the light source is plotted relative to the circle as a distorted circle (e.g., 360 of FIG. 7B). Arrows that point radially into the reference circle 350 indicate areas of decreased saturation while areas that point radially out of the reference circle 350 indicate areas of increased saturation. Arrows that do not point directly to the center of the circle 350 or directly away from the center 350 of the circle are representing hue shift. In short, the color vector graphics can be used to illustrate how objects will appear in an output light relative to a reference light source (e.g., daylight).

With continued reference to FIGS. 7A-7C, the color vector graphics are illustrated for the default condition (FIG. 7A), the positive hue shift condition (FIG. 7B), and the negative hue shift condition (FIG. 7C). In FIG. 7A, the light source output gamut 355 closely tracks the reference circle 350 in the default condition. Attributes of the output light ($R_f$, $R_g$, CCT, $D_{uv}$) in the default condition are also listed in FIG. 7A. In FIG. 7B, the light source output gamut 360 is adjusted in the positive hue shift condition, and in FIG. 7C, the light source output gamut 365 is adjusted in the negative hue shift condition. The CCT value of 3200 K and $D_{uv}$ of 0.0000 is held constant for FIGS. 7A-7C.

Figure 8A:
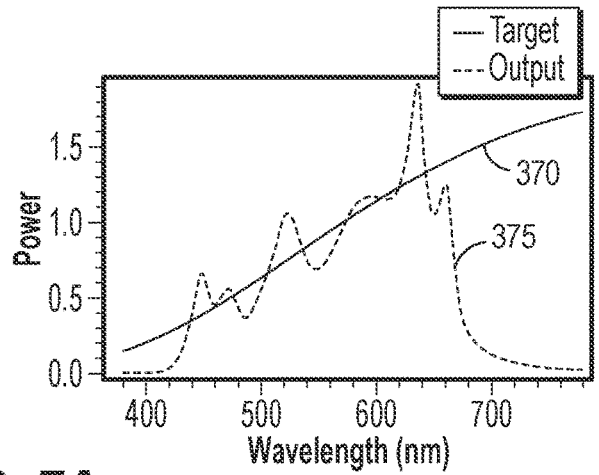
FIG. 8A is a graph illustrating a target output spectral power distribution and an achieved output spectral power distribution for the default condition of FIG. 5.
Figure 8B:
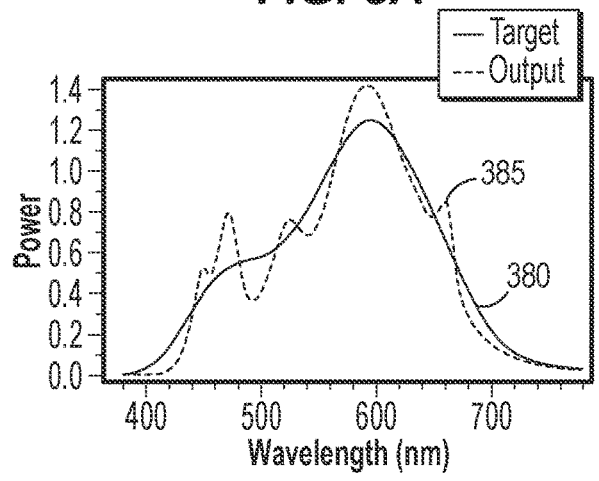
FIG. 8B is a graph illustrating a target output spectral power distribution and an achieved output spectral power distribution for the positive hue shift condition of FIG. 5.
Figure 8C:
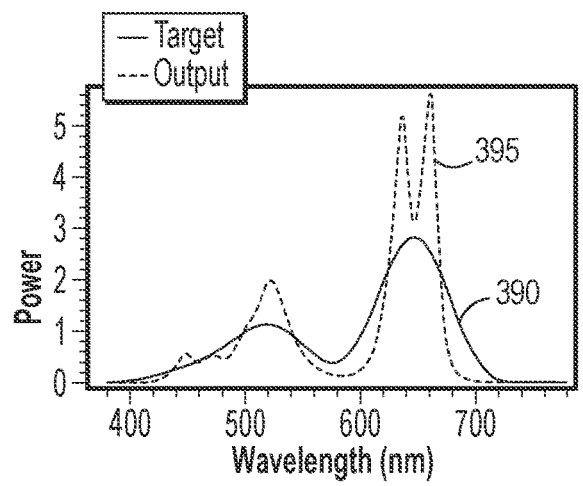
FIG. 8C is a graph illustrating a target output spectral power distribution and an achieved output spectral power distribution for the negative hue shift condition of FIG. 5.

To achieve the default, positive hue shift, and negative hue shift conditions desired by the user, the controller 105 determines the corresponding target output light spectrums 370, 380, 390 illustrated in FIGS. 8A-8C. The target output light spectrums 370, 380, 390 correspond to the default, positive hue shift, and negative hue shift conditions, respectively, and may be determined by selecting one of the many possible metamers for the target chromaticity (e.g., 318). In other words, there are numerous metamers for the target chromaticity (e.g., 318) and the controller 105 selects the metamer that results in the hue shift condition desired by the user. The selection of the metamer for a desired hue shift may be preprogrammed into the memory 140 as a look-up table, for example. In other embodiments, the metamer could also be calculated by methods including, but not limited to, live calculation within the luminaire, live calculation within the controller, stored spectrum, spectrum measured live using a suitable sensor, chromaticity point measured live using a suitable sensor, further input from the user, learned behavior based on a user's previous selections, learned behavior based on a user's stored preferences, or combinations thereof.

With the target output light spectrums 370, 380, 390 determined, conventional spectral matching techniques (such as those disclosed in U.S. Pat. No. 6,683,423; incorporated herein) are utilized to determine how to drive the actual light emitters contained within a given fixture. In other words, the control system 100 determines an idealized target output spectrum for controlling the hue shift of the first example object. As one example, the actual output spectral power distribution achieved for an example light fixture containing eight primary emitters is illustrated as output spectrum distributions 375, 385, 395 on FIGS. 8A-8C. In other words, the output spectrum distributions 375, 385, 395 illustrate a given light fixture's best ability to match the target output light spectrums 370, 380, 390.

In summary, FIGS. 4-8C illustrate the implementation of control for hue shift of a first example object illuminated by a light fixture (i.e., an example light effect level). With the control interface 200, a user adjusts the light that is reflected off of the first example object (i.e., change in reflected light chromaticities 320, 325, 330), while holding the output light chromaticity constant (e.g., chromaticity 318). The hue shift of the first example object is not directly adjustable with conventional controls.

With reference to FIGS. 9-11C, in another embodiment, the lighting effect controlled by the interface 200 is the chroma shift of an object illuminated by the light output of the light arrays 110A-110C. With this control, the illuminated object 103 may appear to an observer (i.e., a human or camera) to be different saturations and can be adjusted by a user while holding the output light chromaticity constant.

Figure 9:
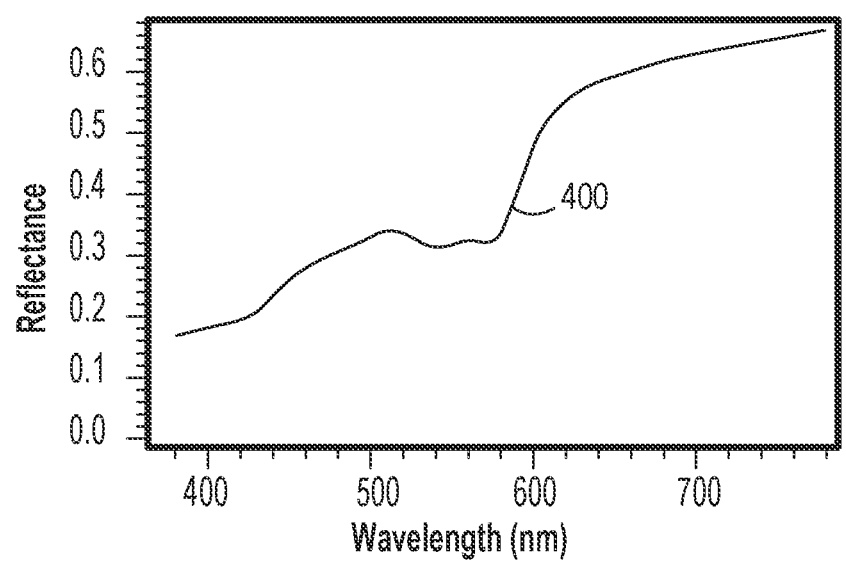
FIG. 9 is a graph of the spectral reflectance function of an object.

With reference to FIG. 9, a spectral reflectance function 400 of a second example object (e.g., one example of human skin) is illustrated. The spectral reflectance function 400 illustrates how incoming light will be reflected off the second example object. With the control interface 200, the chroma (i.e., saturation) of the second example object may be controlled between a default condition, a positive chroma shift condition (e.g., +100 adjustment of the first lighting effect level section 210), and a negative chroma shift condition (e.g., -100 adjustment of the first lighting effect level section 210). In other words, the control interface 200 is utilized by a user to control the saturation appearance of the second example object without changing the chromaticity of the output light. As such, the $R_g$ value of the output light is adjusted to be greater than or less than 100.

Figure 10A:
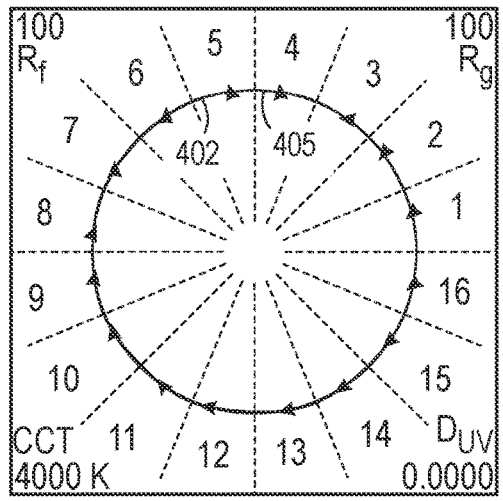
FIG. 10A is a TM-30 color vector graphic for a default condition for the object of FIG. 9.
Figure 10B:
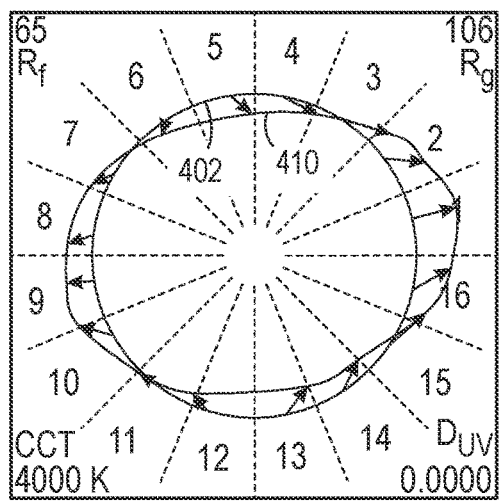
FIG. 10B is a TM-30 color vector graphic for a positive chroma shift condition for the object of FIG. 9.
Figure 10C:
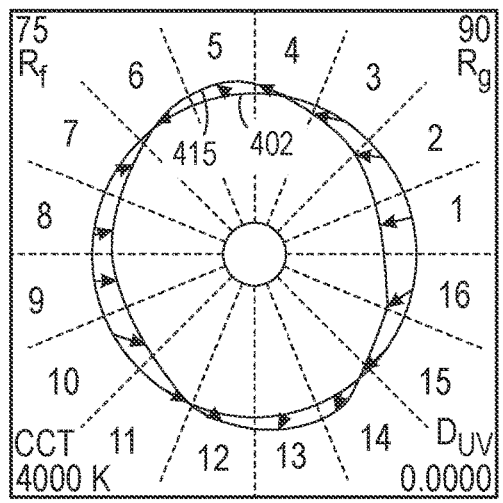
FIG. 10C is a TM-30 color vector graphic for a negative chroma shift condition for the object of FIG. 9.

With reference to FIGS. 10A-10C, the color vector graphics are illustrated for the default condition (FIG. 10A), the positive chroma shift condition (FIG. 10B), and the negative chroma shift condition (FIG. 10C). In FIG. 10A, the light source output gamut 405 closely tracks the reference circle 402 in the default condition and the $R_g$ value is 100. Attributes of the output light ($R_f$, CCT, $D_{uv}$) in the default condition are also listed in FIG. 10A. In FIG. 10B, the light source output gamut 410 is adjusted in the positive chroma shift condition with a $R_g$ value of 106, and in FIG. 10C, the light source output gamut 415 is adjusted in the negative chroma shift condition with a $R_g$ value of 90. The CCT value of 4000 K and $D_{uv}$ of 0.0000 is held constant for FIGS. 10A-10C.

Figure 11A:
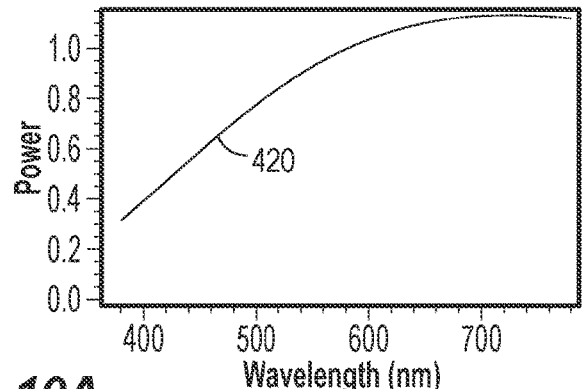
FIG. 11A is a graph illustrating a target output spectral power distribution for the default condition of FIG. 10A.
Figure 11B:
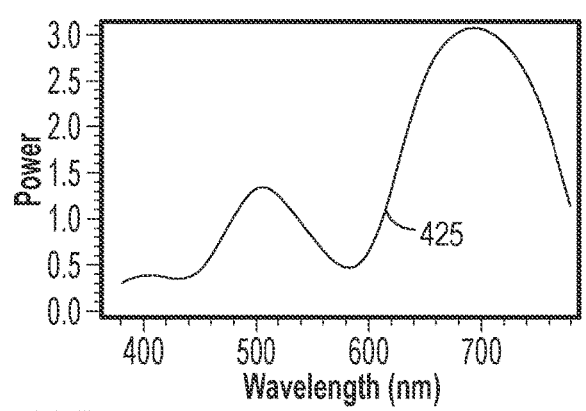
FIG. 11B is a graph illustrating a target output spectral power distribution for the positive chroma shift condition of FIG. 10B.
Figure 11C:
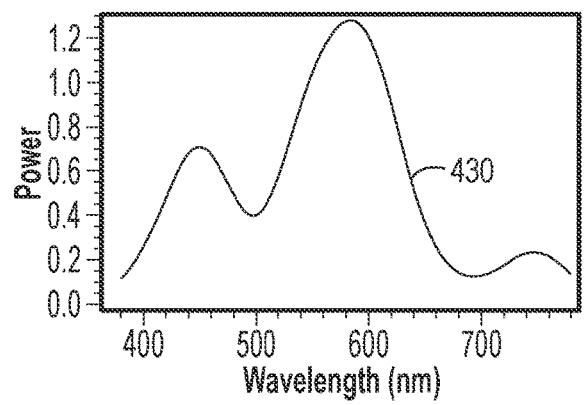
FIG. 11C is a graph illustrating a target output spectral power distribution for the negative chroma shift condition of FIG. 10C.

With reference to FIGS. 11A-11C, for each of the desired chroma-shifts in the second example object there is a corresponding output target spectrum power distribution 420, 425, 430. The target output light spectrums 420, 425, 430 correspond to the default, positive chroma shift, and negative chroma shift conditions, respectively, and may be determined by selecting one of the many possible metamers for the target chromaticity (e.g., CCT=4000 K and $D_{uv}$=0.0000). In other words, there are numerous metamers for the target chromaticity and the controller 105 selects the metamer that results in the chroma shift condition for the second example object desired by the user. The selection of the metamer for a desired chroma shift may be preprogrammed into the memory 140 as a look-up table, for example. In other embodiments, the metamer could also be calculated by methods including, but not limited to, live calculation within the luminaire, live calculation within the controller, stored spectrum, spectrum measured live using a suitable sensor, chromaticity point measured live using a suitable sensor, further input from the user, learned behavior based on a user's previous selections, learned behavior based on a user's stored preferences, or combinations thereof. The target output light spectrums 420, 425, 430 are generalized targets (similar to the target spectrum 370, 380, 390) that are applicable to any type of light fixture being used. Conventional target spectral matching techniques may be utilized to drive emitters in a given light fixture in order to approximate the target.

In summary, FIGS. 9-11C illustrate the implementation of control for chroma shift of a second example object illuminated by a light fixture (i.e., an example light effect level). With the control interface 200, a user adjusts the saturation of the light reflected off of the second example object, while holding the output light chromaticity constant. The chroma shift of the second example object is not directly adjustable with conventional controls.

With reference to FIGS. 12A-13C, in another embodiment, the lighting effect controlled by the interface 200 is the generalized saturation appearance of object(s) (i.e., $R_g$ value) of an approximately 5600 K light output of the light arrays 110A-110C. With the control interface 200, the generalized saturation may be controlled between a default condition, a generalized oversaturated condition (e.g., +100 adjustment of the first lighting effect level section 210), and a generalized undersaturation condition (e.g., -100 adjustment of the first lighting effect level section 210). In other words, the control interface 200 is utilized by a user to control the generalized saturation appearance of object(s) without changing the chromaticity of the output light. As such, the $R_g$ value of the output light is adjusted to be greater than or less than 100.

Figure 12A:
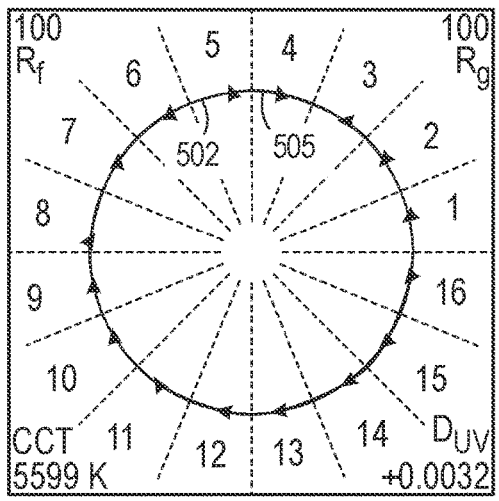
FIG. 12A is a TM-30 color vector graphic for a default condition for a 5600K illuminant.
Figure 12B:
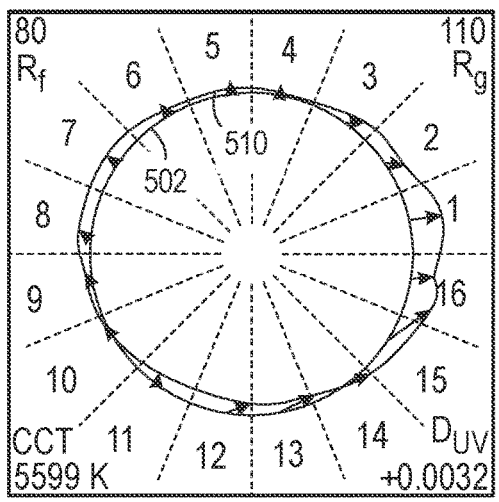
FIG. 12B is a TM-30 color vector graphic for an oversaturated condition for the 5600K illuminant.
Figure 12C:
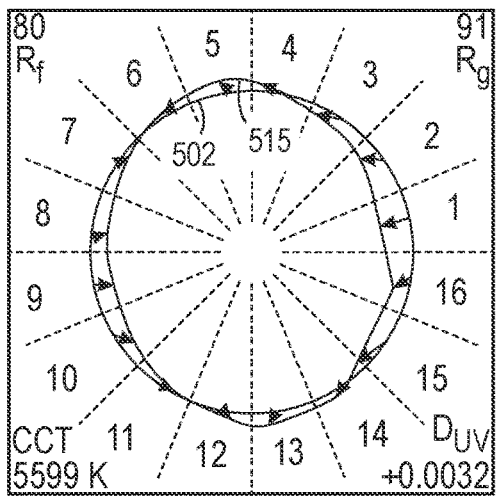
FIG. 12C is a TM-30 color vector graphic for an undersaturated condition for the 5600K illuminant.

With reference to FIGS. 12A-12C, the color vector graphics are illustrated for the default condition (FIG. 12A), the generalized oversaturation condition (FIG. 12B), and the generalized undersaturation condition (FIG. 12C). In FIG. 12A, the light source output gamut 505 closely tracks the reference circle 502 in the default condition and the $R_g$ value is 100. Attributes of the output light ($R_f$, CCT, $D_{uv}$) in the default condition are also listed in FIG. 12A. In FIG. 12B, the light source output gamut 510 is adjusted in the generalized oversaturation condition with a $R_g$ value of 110, and in FIG. 12C, the light source output gamut 515 is adjusted in the generalized undersaturation condition with a $R_g$ value of 91. The CCT value of 5599 K and $D_{uv}$ of 0.0032 is held constant for FIGS. 12A-12C.

Figure 13A:
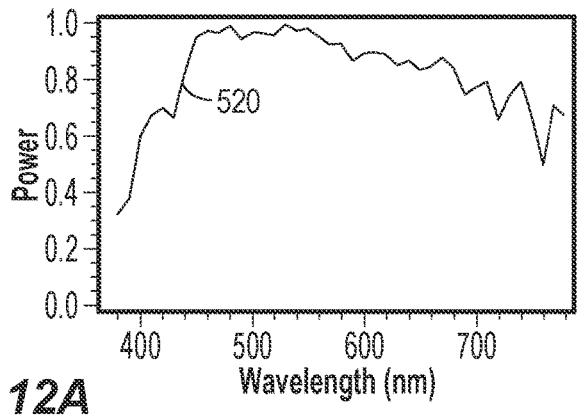
FIG. 13A is a graph illustrating a target output spectral power distribution for the default condition of FIG. 12A.
Figure 13B:
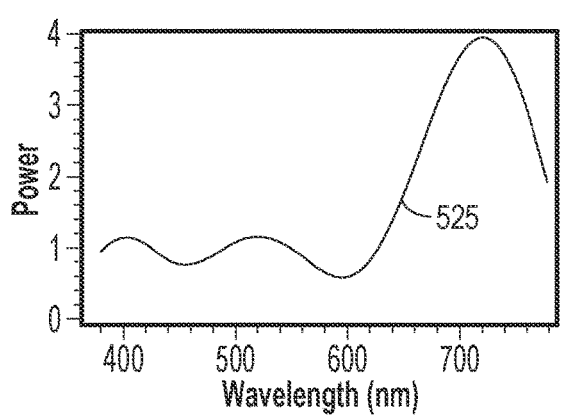
FIG. 13B is a graph illustrating a target output spectral power distribution for the oversaturation condition of FIG. 12B.
Figure 13C:
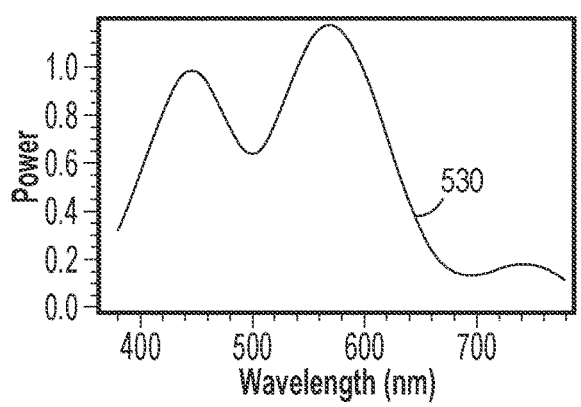
FIG. 13C is a graph illustrating a target output spectral power distribution for the undersaturation condition of FIG. 12C.

With reference to FIGS. 13A-13C, for each of the desired generalized saturation levels there is a corresponding output target spectrum power distribution 520, 525, 530. The target output light spectrums 520, 525, 530 correspond to the default, oversaturated, and undersaturated conditions, respectively, and may be determined by selecting one of the many possible metamers for the target chromaticity (e.g., CCT=5599 K and $D_{uv}$=0.0032). In other words, there are numerous metamers for the target chromaticity and the controller 105 selects the metamer that results in the generalized saturation level desired by the user. The selection of the metamer for a desired saturation level may be preprogrammed into the memory 140 as a look-up table, for example. In other embodiments, the metamer could also be calculated by methods including, but not limited to, live calculation within the luminaire, live calculation within the controller, stored spectrum, spectrum measured live using a suitable sensor, chromaticity point measured live using a suitable sensor, further input from the user, learned behavior based on a user's previous selections, learned behavior based on a user's stored preferences, or combinations thereof. The target output light spectrums 520, 525, 530 are generalized targets (similar to the target spectrum 370, 380, 390) that are applicable to any type of light fixture being used.

In summary, FIGS. 12A-13C illustrate the implementation of control for generalized saturation appearance of object(s) in an approximately 5600K illuminant (i.e., an example light effect level), while holding the output light chromaticity constant. The generalized saturation of a 5600K illuminant is not directly adjustable with conventional controls.

Figure 14:
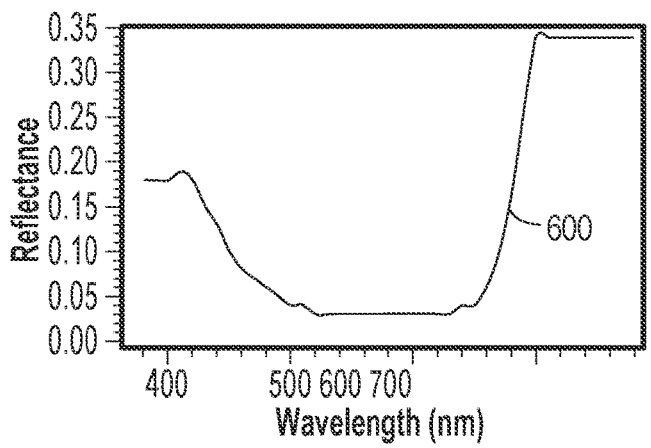
FIG. 14 is a graph of the spectral reflectance function of an object.
Figure 15A:
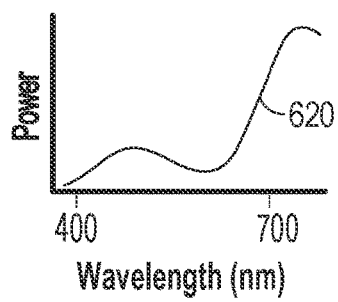
FIG. 15A is a target output spectral power distribution for a non-white chromaticity at a default illuminance of the object of FIG. 14.
Figure 15B:
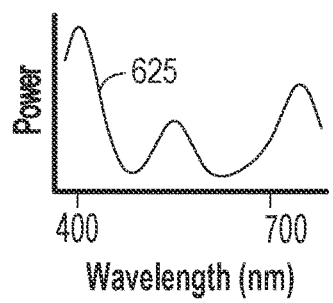
FIG. 15B is a target output spectral power distribution for the non-white chromaticity at an increased illuminance of the object of FIG. 14.
Figure 15C:
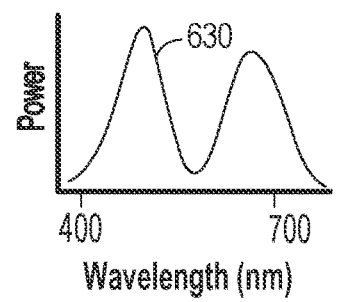
FIG. 15C is a target output spectral power distribution for the non-white chromaticity at a decreased illuminance of the object of FIG. 14.
Figure 16:
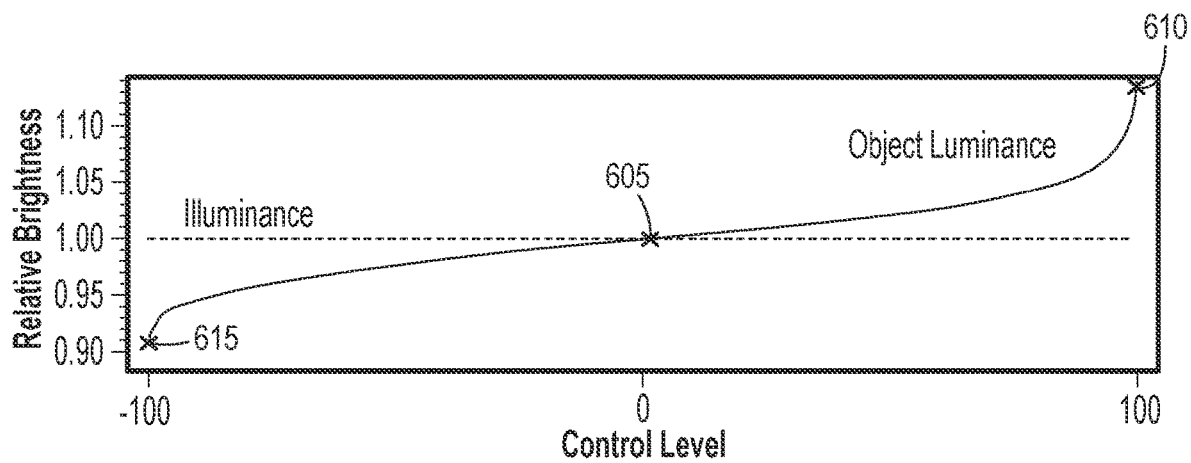
FIG. 16 is a graph illustrating the relative brightness of the object of FIG. 14

With reference to FIGS. 14-16, in another embodiment, the lighting effect controlled by the interface 200 is the relative luminance of an object illuminated by a non-white light output of the light arrays 110A-110C. With this control, the illuminated object 103 may appear to an observer (i.e., a human or camera) to be brighter or darker and can be adjusted by a user while holding the output light chromaticity constant at a non-white color and equal luminous flux.

With reference to FIG. 14, a spectral reflectance function 600 of a third example object (e.g., a purple scarf) is illustrated. The spectral reflectance function 600 illustrates how incoming light will be reflected off the third example object. With the control interface 200, the luminance (i.e., brightness) of the third example object may be controlled between a default condition (point 605 in FIG. 16), an increased relative luminance condition (point 610 in FIG. 16) (e.g., +100 adjustment of the first lighting effect level section 210), and a decreased relative luminance condition (point 615 in FIG. 16) (e.g., −100 adjustment of the first lighting effect level section 210). The minimum (e.g., −100 from the interface 200 of FIG. 3) and maximum (e.g., +100 from the interface 200 of FIG. 3) are defined as the extremes of the lighting effect adjustment. The changes that occur to the target output spectrum between the spectrums 625, 630 for the minimum and maximum control levels, respectively, can then be mapped (e.g., linearly) to produce a target spectrum for control values between −100 and 100 for a controllable lighting effect. In other words, the control interface 200 is utilized by a user to control the luminance of the third example object without changing the chromaticity of the output light—which in this example is a blue output light. The brightness of the third example object is being adjusted relative to the rest of the scene illuminated, since the luminous flux of the output light is held constant.

With reference to FIGS. 15A-15C, for each of the desired relative brightnesses of the third example object there is a corresponding output target spectrum power distribution 620, 625, 630. The target output light spectrums 620, 625, 630 correspond to the default, increased relative brightness, and decreased relative brightness conditions, respectively, and may be determined by selecting one of the many possible metamers for the target chromaticity (e.g., blue, or "steel blue"). In other words, there are numerous metamers for the target chromaticity and the controller 105 selects the metamer that results in the relative brightness condition for the third example object desired by the user. The selection of the metamer for a desired relative luminance may be preprogrammed into the memory 140 as a look-up table, for example. The target output light spectrums 620, 625, 630 are generalized targets (similar to the target spectrums 370, 380, 390) that are applicable to any type of light fixture being used.

Although the described embodiment uses a look-up table to calculate a metamer, in other embodiments, the metamer could also be calculated by methods including, but not limited to, live calculation within the luminaire, live calculation within the controller, stored spectrum, spectrum measured live using a suitable sensor, chromaticity point measured live using a suitable sensor, further input from the user, learned behavior based on a user's previous selections, learned behavior based on a user's stored preferences, or combinations thereof.

In summary, FIGS. 14-16 illustrate the implementation of control for relative brightness of a third example object illuminated by a light fixture (i.e., an example light effect level). With the control interface 200, a user adjusts the luminance of the light reflected off of the third example object relative to its surroundings, while holding the output light chromaticity constant at a non-white color and equal luminous flux. The relative luminance of the third example object illuminated by non-white light is not directly adjustable with conventional controls.

Figure 17:
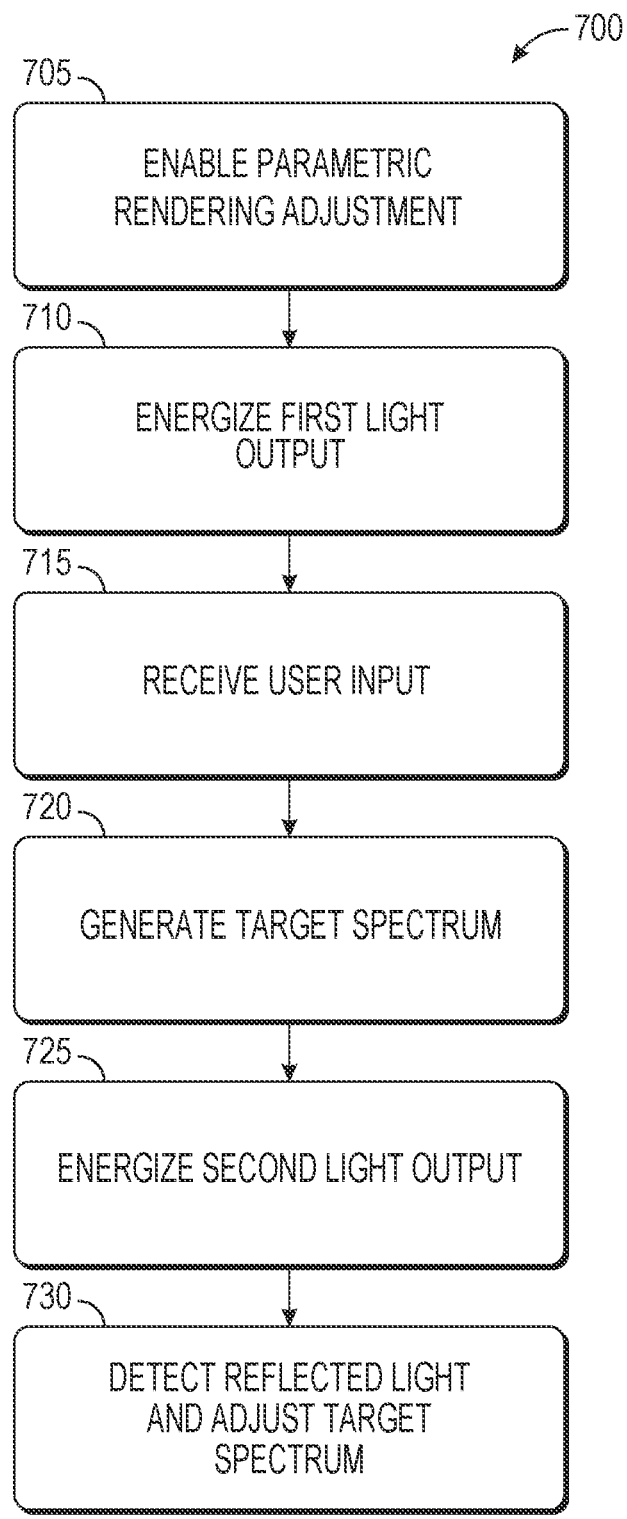
FIG. 17 is a method for controlling a light output for a lighting system.

FIG. 17 illustrates a method 700 for using the control system 100 to adjust a lighting effect of the output light from light arrays 110A-110C. Various steps described herein with respect to the process 700 are capable of being executed simultaneously, in parallel, or in an order that differs from the illustrated serial manner of execution.

In some embodiments, the user enables the parametric rendering adjustment and alters the first lighting effect level 210 and/or the second lighting effect level 215 on the control interface 200 (see FIG. 3) to control the visual appearance of light on the object 103 (STEP 705). In other embodiments, enabling parametric rendering adjustment is not specifically required. Before any adjustments are made, the method 700 includes energizing the light fixture to produce a first light output with a first chromaticity and a first spectral power distribution (STEP 710). In other words, the light fixture generates a default light output. The controller 105 receives signals related to a user input that is representative of a desired adjustment of a lighting effect (STEP 715). The desired adjustment of a lighting effect may include adjustment of the Illumination Engineering Society ("IES") Technical Memorandum 30 ("TM-30") $R_g$ value of the light output; adjustment of a hue shift in an object illuminated by the light output; or adjustment of a chroma shift in an object illuminated by the light output. In other embodiments, the desired adjustment of a lighting effect may include adjustment of one or more parameters or metrics of a light output including but not limited to; Television Lighting Consistency Index ("TLCI"); Color Rendering Index ("CRI") $R_a$; CRI R9; Spectral Similarity Index ("SSI"); TM-30 $R_f$; TM-30 $R_g$; TM-30 $R_{cs,h1}$; TM-30 $Rf_{f,h1}$; TM-30 Annex E's PVF (Preference, Vividness, Fidelity) values; Color Quality Scale ("CQS"); Pigment/dye/colorant alignment; Skin tone quality; Vibrance/richness; Increase or decrease in fluorescence or excitation of optical brighteners; generalized Cool/Warm appearance shift; Light source selection (e.g., tungsten 3200K vs HID 3200K vs fluorescent 3200K). Such adjustments may be applied independently or simultaneously in any combination of multiple parameters. In other embodiments, the desired adjustment of a lighting effect includes adjustment of a relative luminance of an object illuminated by the light output. In a further embodiment the desired adjustment of a lighting effect is to adjust skin tone rendition by suppressing or enhancing the cyan wavelengths. This adjustment, while maintaining a chromaticity match or constant chromaticity, provides the user the ability to tune the appearance of skin tones both to the eye and to a camera.

The method 700 further includes generating a target output light spectrum based on the user input received (STEP 720). In some embodiments, the target spectrum is retrieved from a look-up table stored in the memory 140. In other embodiments, the metamer could also be calculated by methods including, but not limited to, live calculation within the luminaire, live calculation within the controller, stored spectrum, spectrum measured live using a suitable sensor, chromaticity point measured live using a suitable sensor, further input from the user, learned behavior based on a user's previous selections, learned behavior based on a user's stored preferences, or combinations thereof. The method 700 includes energizing the light fixture to produce a second light output with the first chromaticity and a second spectral power distribution (STEP 725). The second spectral power distribution approximates or matches the target spectrum and will depend on the type of light fixture utilized to create the target spectrum.

The inputted first and/or second lighting effect levels 210, 215 are used to modify a spectrum of light produced by the light modules 110A-110C. If the appearance of the object 103 is not satisfactory, the user can modify the first lighting effect level 210 and/or the second lighting effect level 215 on the control interface 200. In this way, the control is open-loop and based on user observations and adjustments. As such, the controller 105 is configured to dynamically alter the light output to achieve a desired visual appearance of the object 103, for example. In some embodiments, the light projected onto the object 103 can be white light or colored light (i.e., light other than white light), as shown in FIGS. 14-16.

In some embodiments, the camera 175 can be used to detect a reflectance of the light off of the object 103 (STEP 730). Based on the reflectance of light off of the object 103, as detected by the camera 175, further adjustments to the target output light spectrum may be made. In this sense, the control may provide a closed-loop system that detects and measures the lighting effect being adjusted. In some embodiments, STEP 730 is not included.

Thus, embodiments described herein provide, among other things, systems, methods, and devices for controlling a light output based on a visual appearance of one or more objects. Various features and advantages are set forth in the following claims.

What is claimed is:

1. A lighting control system comprising:
   one or more light sources;
   one or more driver circuits configured to provide drive signals to the one or more light sources;
   an interface configured to receive an input related to a light output of the one or more light sources, the input being related to an adjustment of a lighting effect; and
   a controller connected to the one or more driving circuits and the interface, the controller including a processor and a memory, the controller configured to:
   control the one or more light sources to produce a first light output with a first chromaticity and a first spectral power distribution,
   receive the input related to the adjustment of the lighting effect,
   generate a target spectrum based on the input, and
   control the one or more light sources to produce a second light output with the first chromaticity and a second spectral power distribution, the second power distribution approximating the target spectrum.

2. The lighting control system of claim 1, wherein the first chromaticity is a non-white color.

3. The lighting control system of claim 1, wherein the interface includes a selection mechanism for selecting a value for the lighting effect.

4. The lighting control system of claim 3, wherein the value for the lighting effect can have a positive value or a negative value.

5. The lighting control system of claim 4, wherein the positive value corresponds to oversaturation and the negative value corresponds to undersaturation.

6. The lighting control system of claim 1, wherein the one or more light sources include one or more chip-on-board ("COB") light sources.

7. The lighting control system of claim 1, further comprising:
   a camera configured to detect light from the one or more light sources that is reflected off of an object.

8. The lighting control system of claim 7, wherein the camera is a spectrometer.

9. The lighting control system of claim 7, wherein the target spectrum is modified based on the light that is reflected off of the object.

10. The lighting control system of claim 1, wherein the lighting effect is one selected from the group consisting of: the TM-30 $R_g$ value of the light output, a hue shift of the light reflected by an object illuminated by the light output, a chroma shift of the light reflected by an object illuminated by the light output, a Television Lighting Consistency Index ("TLCI") value of the light output, a Color Rendering Index ("CRI") Ra value of the light output, a Spectral Similarity Index ("SSI") value of the light output, the relative luminance of an object illuminated by the light output, the TM-30 $R_f$ value of the light output, the TM-30 $R_{cs,h1}$ value of the light output, and the TM-30 $R_{f,h1}$ value of the light output.

11. A method for controlling a light source, the method comprising:
    controlling the light source to produce a first light output with a first chromaticity and a first spectral power distribution;
    receiving an input related to a desired adjustment of a lighting effect;
    generating a target spectrum based on the input; and
    controlling the light source to produce a second light output with the first chromaticity and a second spectral power distribution, the second power distribution approximating the target spectrum.

12. The method of claim 11, wherein the first light output has a first lumen output and the second light output has a second lumen output equal to the first lumen output.

13. The method of claim 11, further comprising:
receiving, via a selection mechanism of the interface, a value for the lighting effect.

14. The method of claim 13, wherein the value for the lighting effect can have a positive value or a negative value.

15. The method of claim 14, wherein the positive value corresponds to oversaturation and the negative value corresponds to undersaturation.

16. The method of claim 11, further comprising:
detect light from the one or more light sources that is reflected off of an object; and
modifying the target spectrum based on the light that is reflected off of the object.

17. The method of claim 11, wherein generating the target spectrum based on the input includes retrieving the target spectrum from a table stored in a memory.

18. The method of claim 11, wherein the lighting effect is one selected from the group consisting of: the TM-30 $R_g$ value of the light output, a hue shift of the light reflected by an object illuminated by the light output, a chroma shift of the light reflected by an object illuminated by the light output, a Television Lighting Consistency Index ("TLCI") value of the light output, a Color Rendering Index ("CRI") Ra value of the light output, a Spectral Similarity Index ("SST") value of the light output, the relative luminance of an object illuminated by the light output, the TM-30 $R_f$ value of the light output, the TM-30 $R_{cs,h1}$ value of the light output, and the TM-30 $R_{f,h1}$ value of the light output.

19. A controller for controlling a light output of a light source, the controller including a non-transitory computer readable medium and a processor, the controller including computer executable instructions stored in the computer readable medium for controlling operation of the controller to:
control the light source to produce a first light output with a first chromaticity and a first spectral power distribution;
receive an input related to an adjustment of a lighting effect;
generate a target spectrum based on the input; and
control the light source to produce a second light output with the first chromaticity and a second spectral power distribution, the second power distribution approximating the target spectrum.

20. The controller of claim 19, the controller further including computer executable instructions stored in the computer readable medium for controlling operation of the controller to:
receive, via a selection mechanism of an interface, a value for the lighting effect.

* * * * *